(12) United States Patent
Jones et al.

(10) Patent No.: US 7,228,389 B2
(45) Date of Patent: *Jun. 5, 2007

(54) SYSTEM AND METHOD FOR MAINTAINING CACHE COHERENCY IN A SHARED MEMORY SYSTEM

(75) Inventors: Andrew M. Jones, Bristol (GB); John Carrey, Bristol (GB)

(73) Assignee: STMicroelectronics, Ltd. (GB)

( * ) Notice: Subject to any disclaimer, the term of this patent is extended or adjusted under 35 U.S.C. 154(b) by 0 days.

This patent is subject to a terminal disclaimer.

(21) Appl. No.: 11/313,261

(22) Filed: Dec. 20, 2005

(65) Prior Publication Data

US 2006/0155935 A1    Jul. 13, 2006

Related U.S. Application Data

(63) Continuation of application No. 09/410,928, filed on Oct. 1, 1999, now Pat. No. 7,000,078.

(51) Int. Cl.
*G06F 12/00* (2006.01)

(52) U.S. Cl. .................. 711/141; 711/130; 711/147; 710/22; 710/38

(58) Field of Classification Search ............ None
See application file for complete search history.

(56) References Cited

U.S. PATENT DOCUMENTS

| | | | |
|---|---|---|---|
| 4,814,981 A | 3/1989 | Rubinfeld | |
| 5,251,311 A | 10/1993 | Kasai | |
| 5,386,565 A | 1/1995 | Tanaka et al. | |
| 5,423,050 A | 6/1995 | Taylor et al. | |
| 5,432,918 A | 7/1995 | Stamm | |
| 5,434,804 A | 7/1995 | Bock et al. | |
| 5,440,705 A | 8/1995 | Wang et al. | |
| 5,446,576 A | 8/1995 | Lynam et al. | |
| 5,452,432 A | 9/1995 | Macachor | |
| 5,455,936 A | 10/1995 | Maemura | |
| 5,479,652 A | 12/1995 | Dreyer et al. | |
| 5,483,518 A | 1/1996 | Whetsel | |

(Continued)

FOREIGN PATENT DOCUMENTS

EP        0165600 B1      11/1991

(Continued)

OTHER PUBLICATIONS

York, Richard, Real Time Debug for System-on-Chip Devices, Jun. 1999, pp. 1-6.

(Continued)

*Primary Examiner*—Brian R. Peugh
(74) *Attorney, Agent, or Firm*—Lisa K. Jorgenson; William J. Kubida

(57) ABSTRACT

A data processing system having shared memory accessible through a transaction-based bus mechanism. A plurality of system components, including a central processor, are coupled to the bus mechanism. The bus mechanism includes a cache coherency transaction within its transaction set. The cache coherency transaction comprises a request issued by one of the system components that is recognized by a cache unit of the central processor as an explicit command to perform a cache coherency operation. The transaction further comprises a response issued by the central processor indicating status of the cache coherency operation.

6 Claims, 4 Drawing Sheets

U.S. PATENT DOCUMENTS

| | | |
|---|---|---|
| 5,488,688 A | 1/1996 | Gonzales et al. |
| 5,530,965 A | 6/1996 | Kawasaki et al. |
| 5,551,001 A | 8/1996 | Cohen et al. |
| 5,570,375 A | 10/1996 | Tsai et al. |
| 5,590,354 A | 12/1996 | Klapproth et al. |
| 5,596,734 A | 1/1997 | Ferra |
| 5,598,551 A | 1/1997 | Barajas et al. |
| 5,608,881 A | 3/1997 | Masumura et al. |
| 5,613,153 A | 3/1997 | Arimilli et al. |
| 5,627,842 A | 5/1997 | Brown et al. |
| 5,657,273 A | 8/1997 | Ayukawa et al. |
| 5,682,545 A | 10/1997 | Kawasaki et al. |
| 5,704,034 A | 12/1997 | Circello |
| 5,708,773 A | 1/1998 | Jeppesen, III et al. |
| 5,724,549 A | 3/1998 | Solgas et al. |
| 5,737,516 A | 4/1998 | Circello et al. |
| 5,751,621 A | 5/1998 | Arakawa |
| 5,768,152 A | 6/1998 | Battaline et al. |
| 5,771,240 A | 6/1998 | Tobin et al. |
| 5,774,701 A | 6/1998 | Matsui et al. |
| 5,778,237 A | 7/1998 | Yamamoto et al. |
| 5,781,558 A | 7/1998 | Inglis et al. |
| 5,796,978 A | 8/1998 | Yoshioka et al. |
| 5,828,825 A | 10/1998 | Eskandari et al. |
| 5,832,248 A | 11/1998 | Kishi et al. |
| 5,835,963 A | 11/1998 | Yoshioka et al. |
| 5,848,247 A | 12/1998 | Matsui et al. |
| 5,860,127 A | 1/1999 | Shimazaki et al. |
| 5,862,387 A | 1/1999 | Songer et al. |
| 5,867,726 A | 2/1999 | Ohsuga et al. |
| 5,884,092 A | 3/1999 | Kiuchi et al. |
| 5,896,550 A | 4/1999 | Wehunt et al. |
| 5,918,045 A | 6/1999 | Nishii et al. |
| 5,930,523 A | 7/1999 | Kawasaki et al. |
| 5,930,833 A | 7/1999 | Yoshioka et al. |
| 5,944,841 A | 8/1999 | Christie |
| 5,950,012 A | 9/1999 | Shiell et al. |
| 5,953,538 A | 9/1999 | Duncan et al. |
| 5,956,477 A | 9/1999 | Ranson et al. |
| 5,978,874 A | 11/1999 | Singhal et al. |
| 5,978,902 A | 11/1999 | Mann |
| 5,983,017 A | 11/1999 | Kemp et al. |
| 5,983,379 A | 11/1999 | Warren |
| 6,047,358 A | 4/2000 | Jacobs |
| 6,216,207 B1 | 4/2001 | Miller et al. |
| 6,295,582 B1 | 9/2001 | Spencer |
| 6,345,340 B1 | 2/2002 | Arimilli et al. |
| 6,347,361 B1 | 2/2002 | Arimilli et al. |
| 6,418,514 B1 | 7/2002 | Arimilli et al. |
| 2002/0007442 A1 | 1/2002 | Farrall et al. |

FOREIGN PATENT DOCUMENTS

| | | |
|---|---|---|
| EP | 0636976 A1 | 2/1995 |
| EP | 0636976 B1 | 2/1995 |
| EP | 0652516 A1 | 5/1995 |
| EP | 0702239 A2 | 3/1996 |
| EP | 0720092 A1 | 7/1996 |
| EP | 0933926 A1 | 8/1999 |
| EP | 0945805 A1 | 9/1999 |
| EP | 0959411 A1 | 11/1999 |
| JP | 8320796 A | 12/1996 |
| JP | 8329687 A | 12/1996 |
| JP | 9212358 A | 8/1997 |
| JP | 9311786 A | 12/1997 |
| JP | 10106269 A | 4/1998 |
| JP | 10124484 A | 5/1998 |
| JP | 10177520 A | 6/1998 |
| WO | PCT/JP96/02819 | 9/1996 |

OTHER PUBLICATIONS

Chu et al., "Write Buffer Design for On-Chip Cache", © 1994, IEEE< p. 311-316.

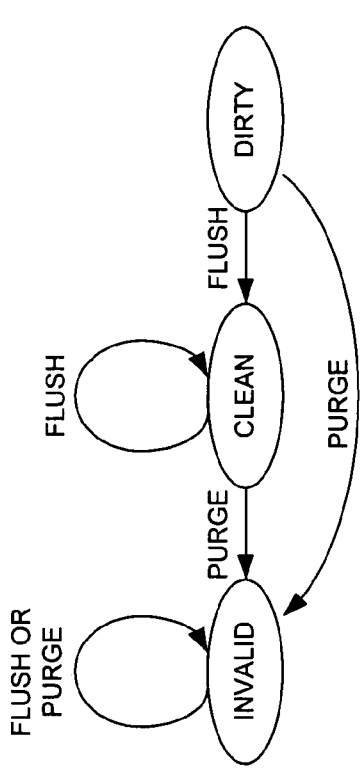
FIG. 5
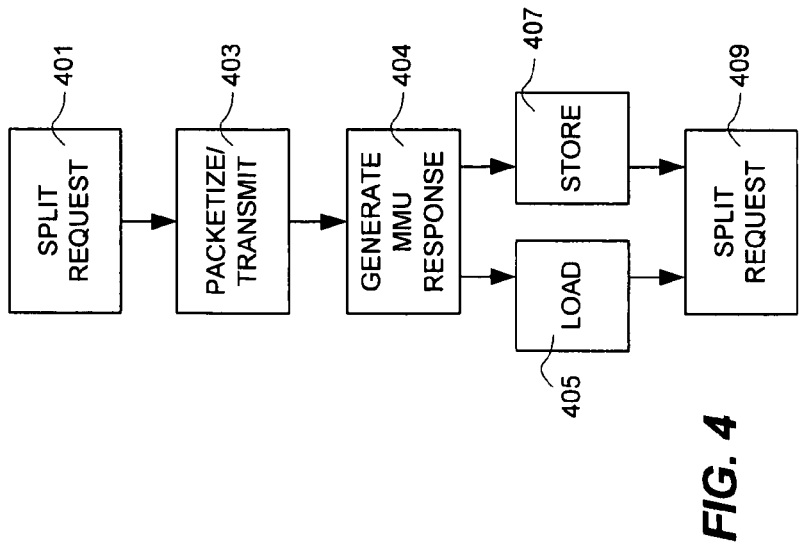
FIG. 4
FIG. 6

SYSTEM AND METHOD FOR MAINTAINING CACHE COHERENCY IN A SHARED MEMORY SYSTEM

CROSS-REFERENCE TO RELATED APPLICATION

The present application is a continuation of and claims priority to U.S. patent application Ser. No. 09/410,928, filed Oct. 1, 1999 now U.S. Pat. No. 7,000,078, entitled "System and Method for Maintaining Cache Coherency in a Shared Memory System", the disclosure of which is herein specifically incorporated by this reference.

BACKGROUND OF THE INVENTION

1. Field of the Invention

The present invention relates in general to microprocessor systems and, more particularly, to a system, method, and mechanism providing cache coherency in microprocessor systems with cache support.

2. Relevant Background

Microprocessors manipulate data according to instructions specified by a computer program. The instructions and data in a conventional system are stored in main memory which is coupled to the processor by a memory bus. The ability of processors to execute instructions has typically outpaced the ability of memory subsystems to supply instructions and data to the processors. As used herein the terms "microprocessor" and "processor" include complete instruction set computers (CISC), reduced instruction set computers (RISC) and hybrids.

Most processors use a cache memory system to speed memory access. Cache memory comprises one or more levels of dedicated high-speed memory holding recently accessed data and instructions, designed to speed up subsequent access to the same data and instructions. Cache technology is based on a premise that programs frequently re-execute the same instructions and data. Also, instructions and data exhibit a trait called "spatial locality" which means that instructions and data to be used in the future tend to be located in the same general region of memory as recently used instructions and data. When data is read from main system memory, a copy is also saved in the cache memory, along with an index to the associated location in main memory. Often the cache entry includes not only the data specifically requested, but data surrounding the specifically requested data.

The cache then monitors subsequent requests for data to see if the information needed has already been stored in the cache. If the data had indeed been stored in the cache, the data is delivered immediately to the processor while the attempt to fetch the information from main memory is aborted (or not started). If, on the other hand, the data had not been previously stored in cache then it is fetched directly from main memory and also saved in cache for future access.

Microprocessor performance is greatly enhanced by the use of cache memory. Cache memory comprises memory devices that have lower latency than the main memory. In particular, one or more levels of on-chip cache memory provide particularly low-latency storage. On-chip cache memory can be implemented in memory structures and devices having latency of only one or two clock cycles. Cache memory, particularly on-chip cache memory, is particularly suited to being accessed by the microprocessor at high speed.

A task for the cache subsystem is to maintain cache coherency. Cache coherency refers to the task of ensuring that the contents of cache memory are consistent with the corresponding locations in main memory. When only the microprocessor can access main memory cache coherency is a relatively simple task. However, this restriction forces all accesses to main memory to be routed through the microprocessor. Many devices such as graphics modules, mulitimedia modules and network interface modules, for example, can make use of system memory for efficient operation. However, if these modules must tie up the processor in order to use system memory, overall performance is lowered.

To make more efficient use of the processor, many systems allow modules and peripherals other than the microprocessor to access main memory directly. The system bus in a typical computer system architecture couples to the microprocessor and to a direct memory access (DMA) controller. Other modules and peripherals coupled to the bus can access main memory without tying up the microprocessor using the DMA controller. This may also be referred to as a shared memory system as all or part of the main memory is shared amongst the variety of devices, including the microprocessor, that can access the memory.

Shared memory systems complicate the cache coherency task significantly. DMA devices access main memory directly, but usually do not access the cache memory directly. To ensure that the DMA device obtains correct data steps must be taken to verify that the contents of the shared memory location being accessed by a DMA device have not been changed in the cached copy of that location being used by the microprocessor. Moreover, the latency imposed by this coherency check cannot be such as to outweigh the benefits of either caching or direct memory access.

One solution is to partition the main memory into cacheable and uncacheable portions. DMA devices are restricted to using only uncacheable portions of memory. In this manner, the DMA device can be unconcerned with the cache contents. However, for the data stored in the uncacheable portions all of the benefits of cache technology are lost.

Another solution is to enable the DMA controller or other hardware coupled to the system bus to "snoop" the cache before the access to shared memory is allowed. An example of this is in the peripheral component interconnect (PCI) bus that enables the PCI bridge device to snoop the CPU cache automatically as a part of any DMA device transaction. This allows shared memory to be cached, however, also adds latency to every DMA transaction. Systems having a single system bus on which all DMA transactions are performed can implement snooping protocols efficiently. This is because a single bus system enables any device to broadcast a signal to all other devices quickly and efficiently to indicate that a shared memory access is occurring.

There is an increasing demand for systems with robust, complex, multi-path communications subsystems for interconnecting system components. Complex communications networks enable greater expansion potential and customization. Moreover, such systems enable existing, proven subsystem and module designs (often referred to as intellectual property or "IP") to be reused. In systems with more complex bus networks that enable multiple independent paths a network broadcast can be slow making conventional snoop protocols impractical.

Another solution used for more complex networks uses a centralized or distributed directory structure to hold cache status information. These may be seen, for example, in multiprocessor architectures. Any device accessing shared memory first accesses the directory to determine whether the target memory address is currently cached. When the address is not cached, a direct access to the shared memory location is made. When the address is cached, the cached data is written back to main memory before the direct access is completed. Directory-based solutions are faster than snoop operations, but also add latency to each DMA access as well as hardware overhead to support the directory structure.

Existing solutions often rely on interrupt signals generated by the device and interrupt handler routines to implement cache operations such as a snoop. Interrupt mechanisms interrupt instruction flow and delay processing. Interrupt handlers involve multiple instructions and require state of the currently executing thread to be stored while the interrupt handler executes and restored after the interrupt handler executes. Hence, interrupt mechanisms for executing cache operations are an inefficient means to execute what may amount to a single cache instruction.

A need exists for a mechanism, method and system that enables efficient shared memory access in a cached memory system. A need specifically exists for a mechanism to perform cache coherency in a system have a complex, multipath system bus.

SUMMARY OF THE INVENTION

The present invention involves a data processing system having shared memory accessible through a transaction-based bus mechanism. A plurality of system components, including a central processor, are coupled to the bus mechanism. The bus mechanism includes a cache coherency transaction within its transaction set. The cache coherency transaction comprises a request issued by one of the system components that is recognized by the central processor as an explicit command to perform a cache coherency operation. The transaction further comprises a response issued by the central processor indicating status of the cache coherency operation.

The present invention involves a method for managing cache coherency in a shared memory system having a plurality of modules including a processing unit coupled to a system bus. One of the processing modules initiates a cache coherency transaction on the system bus. In response to the cache coherency transaction, the processing unit executes a cache coherency operation and responds to the processing module that initiated the transaction with an acknowledge message indicating the cache state.

The foregoing and other features, utilities and advantages of the invention will be apparent from the following more particular description of a preferred embodiment of the invention as illustrated in the accompanying drawings.

BRIEF DESCRIPTION OF THE DRAWINGS

FIG. 4 shows a flow diagram illustrating shared memory access operation in accordance with the present invention;

FIG. 5 shows a state diagram indicating transitions used to support cache coherency in accordance with the present invention; and FIG. 6 shows an exemplary transaction packet used in an implementation of a cache transaction in accordance with the present invention.

DETAILED DESCRIPTION OF THE PREFERRED EMBODIMENTS

The preferred implementation of the present invention comprises a system that may be implemented as a single integrated circuit system-on-a-chip solution or as multiple integrated circuits with varying levels of integration. In either case, sub-components of the system are interconnected by a bus network that may comprise one or more types of bus technologies. The bus network implements a transaction set comprising a plurality of defined transactions that can be communicated over the bus network. Each transaction comprises a request/response pair or a set of request/response pairs.

In the particular implementation, the transaction set includes cache transaction primitives. One of the system components coupled to the bus network is a central processing unit (CPU). Among other features, the CPU includes a cache management or memory management unit that allows the CPU to cache instructions and data from main memory. Modules, devices and sub-components coupled to the bus network use the cache transactions to cause the CPU to perform cache management activities on their behalf. In this manner, when a module desires to access main memory directly, cache coherency can be ensured by issuing a cache transaction prior to the direct memory access. In the preferred implementation, these cache transactions are interpreted by the CPU as explicit commands.

Figure 1:
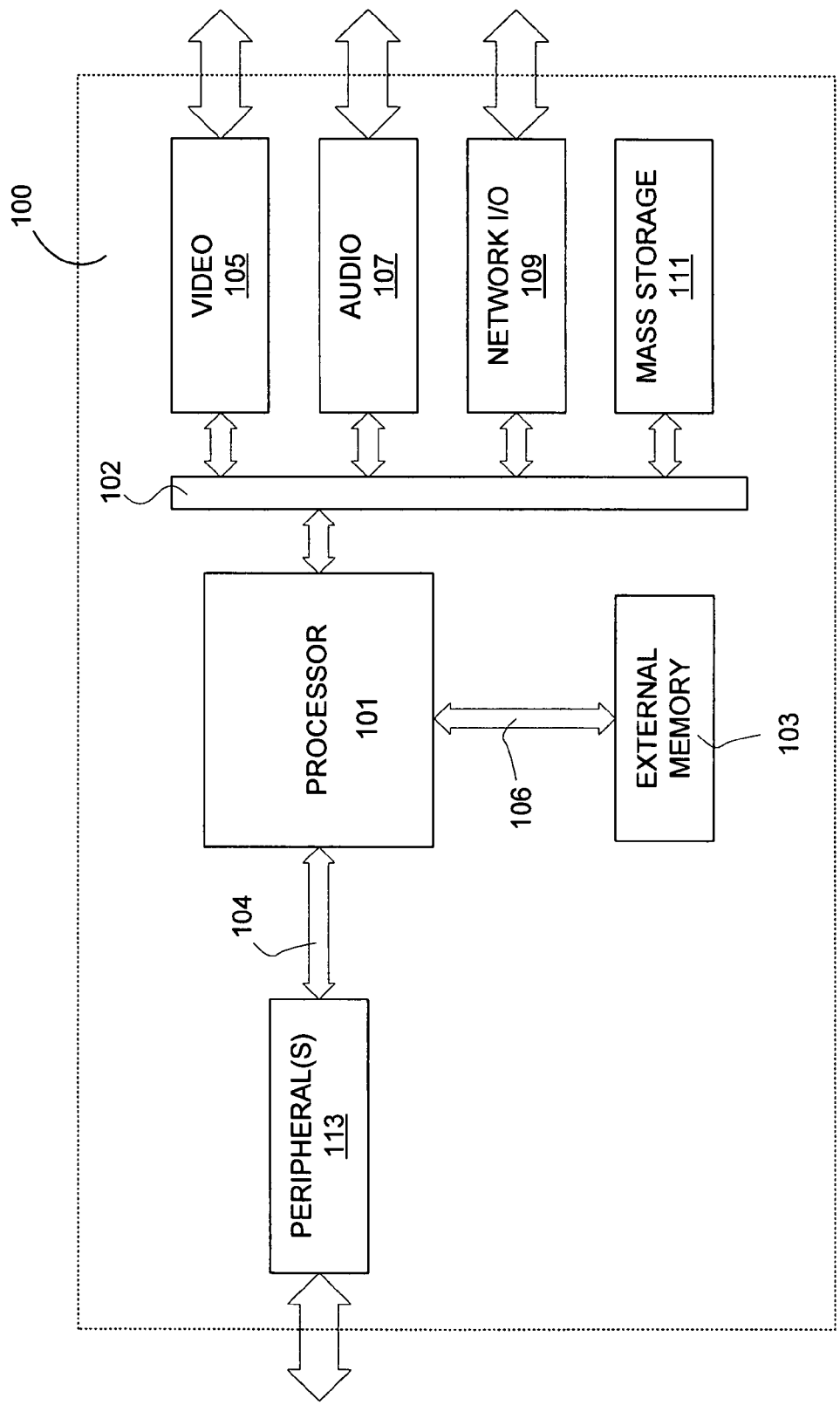
FIG. 1 shows in block diagram form a computer system incorporating an apparatus and system in accordance with the present invention.

Any system is usefully described as a collection of processes or modules communicating via data objects or messages as shown in FIG. 1. The modules may be large collections of circuitry whose properties are somewhat loosely defined, and may vary in size or composition significantly. The data object or message is a communication between modules that make up the system. To actually connect a module within the system it is necessary to define an interface between the system and the component module.

The present invention is illustrated in terms of a media system 100 shown in FIG. 1. The present invention supports systems requiring a number of components that use and benefit from direct memory access, such as media system 100. Media processor 100 comprises, for example, a "set-top box" for video processing, a video game controller, a digital video disk (DVD) player, and the like. Essentially, system 100 is a special purpose data processing system targeted at high throughput multimedia applications. Features of the present invention are embodied in processor 101 that operates to communicate and process data received through a high speed bus 102, peripheral bus 104, and memory bus 106.

Video controller 105 receives digital data from system bus 102 and generates video signals to display information on an external video monitor, television set, and the like. The generated video signals may be analog or digital. Optionally, video controller may receive analog and/or digital video signals from external devices as well. Audio controller 107 operates in a manner akin to video controller 105, but differs in that it controls audio information rather than video. Network I/O controller 109 may be a conventional network card, ISDN connection, modem, and the like for communicating digital information. Mass storage device 111 coupled to high speed bus 102 may comprise magnetic disks, tape drives, CDROM, DVD, banks of random access memory, and the like. A wide variety of random access and read only memory technologies are available and are equivalent for purposes of the present invention. Mass storage 111 may include computer programs and data stored therein.

In a particular example, high speed bus 102 is implemented as a peripheral component interconnect (PCI) industry standard bus. An advantage of using an industry standard bus is that a wide variety of expansion units such as controller's 105, 107, 109 and 111 are readily available. PCI bus 102 supports direct memory access components using a snooping protocol.

Peripherals 113 include a variety of general purpose I/O devices that may require lower bandwidth communication than provided by high speed bus 102. Typical I/O devices include read only memory (ROM) devices such as game program cartridges, serial input devices such as a mouse or joystick, keyboards, and the like. Processor 101 includes corresponding serial port(s), parallel port(s), printer ports, and external timer ports to communicate with peripherals 113. Additionally, ports may be included to support communication with on-board ROM, such as a BIOS ROM, integrated with processor 101.

External memory 103 is typically required to provide working storage for processor 101 and may be implemented using dynamic or static RAM, ROM, synchronous DRAM, or any of a wide variety of equivalent devices capable of storing digital data in a manner accessible to processor 101.

Figure 2:
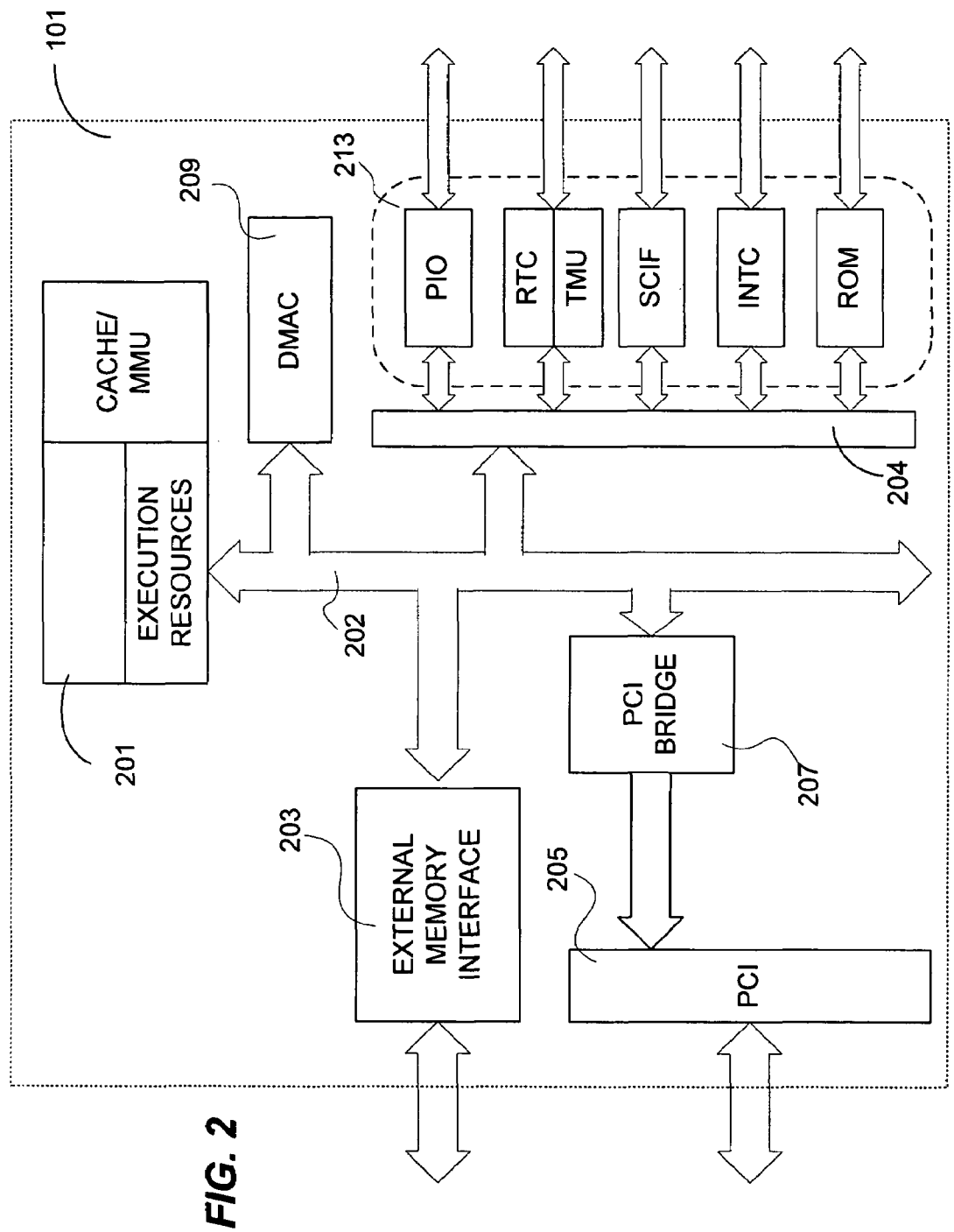
FIG. 2 shows a processor in block diagram form incorporating the apparatus and method in accordance with the present invention.

Processor 101 is illustrated in greater detail in the functional diagram of FIG. 2. One module in a data processing system is a central processor unit (CPU) core 201. The CPU core 201 includes, among other components (not shown), execution resources (e.g., arithmetic logic units, registers, control logic) and cache memory. These functional units, discussed in greater detail below, perform the functions of fetching instructions and data from memory, preprocessing fetched instructions, scheduling instructions to be executed, executing the instructions, managing memory transactions, and interfacing with external circuitry and devices.

CPU core 201 communicates with other components shown in FIG. 2 through a system bus 202. In the preferred implementation system bus 202 is a proprietary, high-speed network bus using packet technology and is referred to herein as a "super highway". Bus 202 couples to a variety of system components. Of particular importance are components that implement interfaces with external hardware such as external memory interface unit 203, PCI bridge 207, and peripheral bus 204. Each component coupled to bus 202 may be a target of a transaction packet (shown in FIG. 6) on bus 202 as specified by an address within the transaction packet.

External memory interface 203 provides an interface between the system bus 202 and the external main memory subsystem 103 (shown in FIG. 1). The external memory interface comprises a port to system bus 202 and a DRAM controller. An important feature of the present invention is that the memory accessed through external memory interface 203 is coherent as viewed from the system bus 202. All requests are processed sequentially on external memory interface 203 in the order of receipt of those requests by EMI unit 203. However the corresponding Store response packets may not be returned to the initiator on system bus 202 until the write operations are actually completed to DRAM. Since all the requests to the same address are processed in order (as they are received from the SuperHyway interface) on the DRAM interface, the coherency of the memory is achieved.

The organization of interconnects in the system illustrated in FIG. 2 is guided by the principle of optimizing each interconnect for its specific purpose. The bus system 202 interconnect facilitates the integration of several different types of sub-systems. It is used for closely coupled subsystems which have stringent memory latency/bandwidth requirements. The peripheral subsystem 204 supports bus standards which allow easy integration of hardware of types indicated in reference to FIG. 1 through interface ports 213. PCI bridge 207 provides a standard interface that supports expansion using a variety of PCI standard devices that demand higher performance that are available through peripheral port 204. The system bus 202 may be outfitted with an expansion port which supports the rapid integration of application modules without changing the other components of system 101.

It should be noted that in the system of the present invention, the PCI bridge 207 is not coupled directly to CPU 201 and so cannot support snooping in the conventional manner specified by the PCI standards. Instead, system bus 202 provides a protocol in accordance with the present invention that maps cache commands from, for example, PCI bridge 207 onto a cache transaction within the transaction set of bus 202. CPU 201 responds to the cache transaction by implementing the expected cache command.

Figure 3:
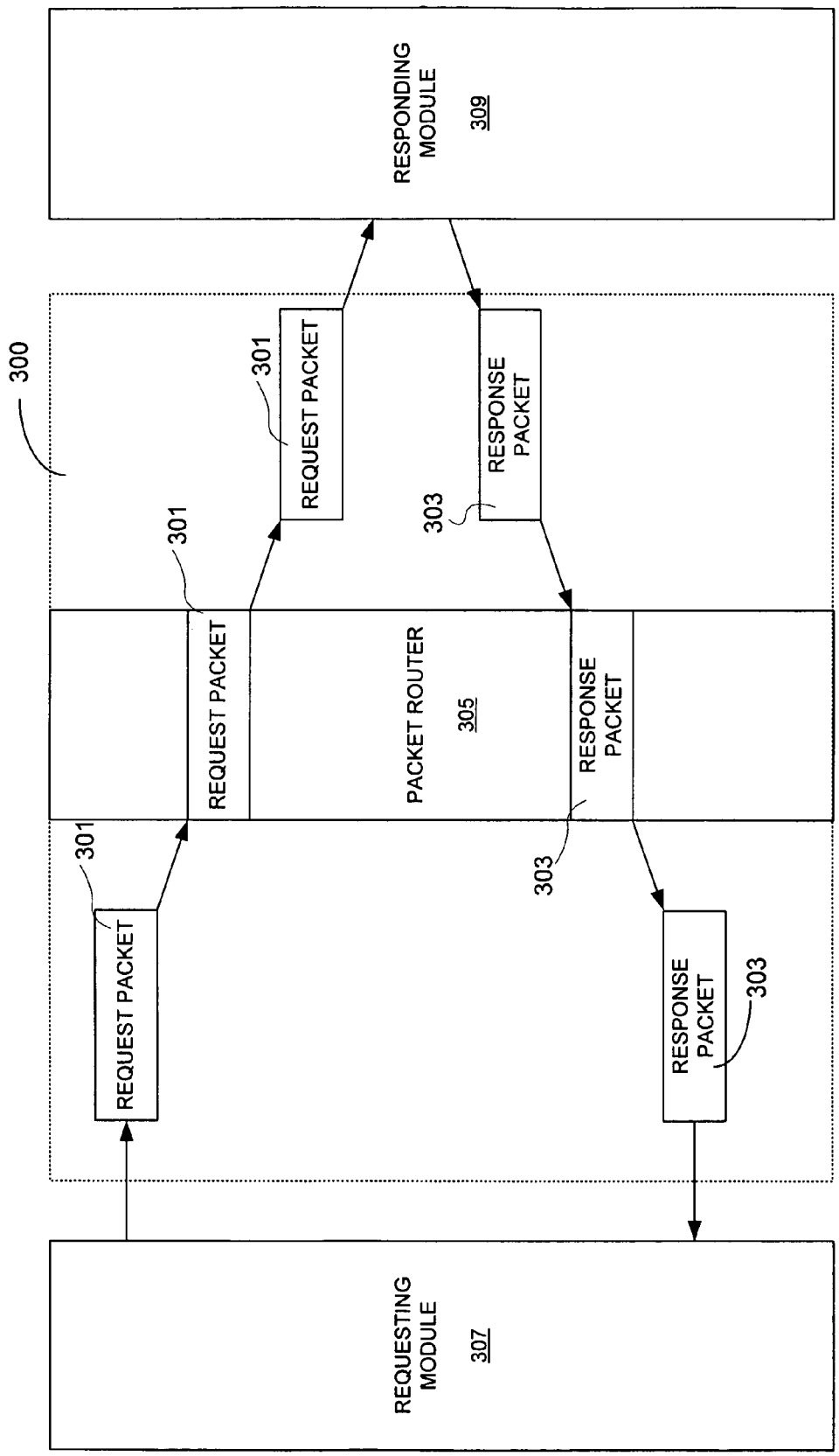
FIG. 3 illustrates a bus transaction in accordance with the present invention.

FIG. 3 illustrates an exemplary transaction 300 comprising a request packet 301 and a response packet 303 for communication across superhighway 202. Packets 301 and 303 comprise a unit of data transfer through the packet-router 305. Communication between modules 307 and 309 is achieved by the exchange of packets between those modules. Each module 307 and 307 is assigned or negotiates with packet router 305 for a unique address. In the particular example, each address is an unsigned integral value that corresponds to a location in the physical memory space of processor 201. Some of the address bits indicate the destination module and some of the address bits (called "offset bits") indicate a particular location within that destination module. The size of the physical address, the number of destination bits, and the number of offset bits are implementation dependent selected to meet the needs of a particular implementation.

Packet router 305 uses the destination bits to perform routing. Packet router 305 inspects the destination bits of a received packet, determines the appropriate port to which the packet is to be routed, and routes the packet to the specified module. Packet router 305 may be implemented as a bus, crossbar, packet routing network, or equivalent packet transport mechanism to meet the needs of a particular application.

A packet comprises a plurality of fields indicating information such as the type of transaction, target address of the transaction, and/or data needed or produced by the transaction. An exemplary packet 601 suitable for cache transactions in accordance with the present invention is shown in FIG. 6. Each field has a number of possible values to characterize that packet. Every packet contains a destination field, labeled "target module address" in FIG. 6, which is used by packet router 305 to determine the module to which the packet should be routed. Additionally, each packet includes a data field that in the case of cache transactions holds a physical address of the cache line to be modified. In the particular implementation, every packet has a class and a type. A packet's class is either a request or a response. A response packet class is subdivided into either an ordinary response or an error response. A packet's type indicates the kind of transaction associated with that packet. The packet class and type together form a packet opcode.

Additional fields may be included such as a source identity field and a transaction identity field shown in FIG.

6. The source identity field indicates the module initiating a transaction and may be provided by the module itself or by logic within system bus 202. In a particular implementation, the source identity field comprises eight bits and so allows for up to 256 unique transaction initiators. The source identity field simplifies the task of packet tracing and allows construction of pipelined, out-of-order systems. The source identity information can also be used by arbitration algorithms to prioritize transactions based upon the transaction source, provide enhanced memory protection based upon the initiator, and enhance debug visibility. The transaction identity field contains transaction-specific information that is optionally used to associate a specific request-response pair. This field may include, for example, information indicating the packets order in a sequence of requests for purposes of re-ordering a plurality of requests into a proper sequence.

Each packet is associated with a source module and a destination module. The source sends a packet 301 or 303 over a port into a packet-router 305 within bus 202. Packet-router 305 arranges for the packet to be routed to a p-port connected to the destination. The destination then receives this packet over that p-port from the packet-router. It is possible for the source and destination to be the same module. It is also possible for a packet to be decomposed into multiple "cells" where each cell of the packet has the same source and destination module and same packet type. The multiple cells are combined into a packet at the destination.

A "transaction" 300, suggested by the dashed line box in FIG. 3, is an exchange of packets that allows a module to access the state of another module using the superhighway bus 202. A transaction comprises a transfer of a request packet 301 from a requesting module 307 (also called an "initiator") to a responding module 309 (also called a "target"), followed by a response packet 303 from that responding module 309 back to the requesting module 307. The request packet 301 initiates the transaction and its contents determine the access to be made. The response packet 303 completes the transaction and its contents indicate the result of the access. A response packet 303 may also indicate whether the request was valid or not. The response packet 303 can be formatted as an ordinary response if the request was valid or an error response if the request was invalid.

In the preferred implementation there is a 1:1 correspondence between request and response packets. The transaction protocol in the preferred implementation is "split phase" because the request packet 301 and response packet 303 are asynchronous with respect to each other. Requests can be pipelined in that a requesting module 307 can generate multiple request packets 301 before any response packets 303 are received so as to overlap latencies associated with transactions.

Responding 309 modules process requests in the order received, and do not generate a response packet 303 until the requested action is committed. In this manner, apart from internal latency inside the destination module, the access is completed as viewed by all modules coupled to bus 202 when a request packet 301 is received. Any subsequently received requests to that target module will act after that access. This guarantees that time-ordering of access at a destination can be imposed by waiting for the corresponding response.

One of the packet types of particular importance to the present invention is a cache coherency packet type associated with a cache coherency transaction. Cache coherency transactions include a "flush" and a "purge" transaction. These are provided primarily to support the integration of DMA type modules such as PCI bridge 207 shown in FIG. 2, but more generally support any module that uses main memory provided through external memory interface 203.

The flush transaction has a single operand which is the physical address which is to be flushed from the cache. When a flush transaction is received from bus 202 by the cache/MMU within CPU 201 it causes the cache/MMU to lookup the address in the cache. If the lookup yields a miss or a hit to a cache line that is unmodified with regard to main memory, the cache/MMU issues a response to the flush request immediately following the lookup. If the lookup yields a hit to a cache line that is modified with regard to main memory, the cache controller causes a writeback of the specified line to main memory. Following the writeback the cache/MMU issues a response to the flush request. The response generated by the cache/MMU in either case is a simple acknowledgement that does not carry any data indicating that main memory and cache are cohered.

The purge transaction has a single operand which is the physical address which is to be purged from the cache. When a purge transaction is received from bus 202 by the cache/MMU within CPU 201 it causes the cache/MMU to lookup the address in the cache. If the lookup yields a miss the cache/MMU issues a response to the purge request immediately following the lookup. If the lookup yields a hit to the cache line modified with regard to main memory, the cache controller causes a writeback of the specified line to main memory. If the lookup yields a hit the cache line is invalidated whether or not the line is modified with respect to main memory. Following the invalidation the cache/MMU issues a response to the purge request. The response generated by the cache/MMU in either case is a simple acknowledgement that does not carry any data indicating that main memory and cache are cohered and that the specified memory location is no longer valid in the cache.

The use of flush and purge by a module provides a level of cache coherency. These operations guarantee that a read operation by a module to an address in a shared memory system will receive the value last written to that address. The time of access is given as the time at which the flush is received by the cache controller. The module read operation is guaranteed to get a data value coherent with the value of the system memory no earlier than the time of access. In the case of a write operation by a module to an address in shared memory, the purge operation guarantees that the written data is readable by all memory users after the time of access. The time of access is given as the time at which the write operation is performed to system memory following the purge of the data cache(s).

In a typical operation, a component coupled to PCI bus 205 wishes to access a shared memory location, it asserts the memory request using PCI standard DMA signaling protocol to PCI bridge 207. Because CPU 201 is not coupled to the PCI bus 205 directly, this signaling protocol is not recognized by CPU 201. Although the operation in accordance with the present invention is described with particular reference to PCI module 207, it should be understood that any module coupled to bus 202 that desires to use shared memory can implement the steps outlined below.

When PCI module 207 wishes to complete the coherent request to shared memory, module 207 performs the steps shown generally in FIG. 4. In step 401 the module splits up the memory request into a plurality of non-cache line straddling system interconnect requests. In this manner each request is ensured of affecting a single cache line and the cache/MMU does not need to implement special behavior to recognize and implement cache straddling requests. Both flush requests and purge requests are packetized and addressed to a port associated with cache/MMU in CPU 201 in step 403. The requesting module then waits to receive a response from the cache/MMU in step 404.

For a read operation from shared memory, a load request is then made in step 405 in a packet addressed to the memory interface unit 203. In the case of a write operation, a store request packet is addressed to memory interface unit 203 in step 407. In step 409 external memory interface unit generates a response packet indicating completion of the coherent access.

In this manner the present invention provides cache control instructions that are integrated into the basic transaction set of bus 202. This feature enables any module coupled to bus 202 to implement cache control and ensure coherent use of shared memory resources in a system where multiple memory users can concurrently read information while only one memory user has exclusive write control. Corresponding logic in the cache/MMU of CPU 201 responds to the cache control transactions to perform the cache control operation on behalf of the requesting module. The logic in the cache/MMU has an ability to recognize and process cache control transactions directly without the assistance of instructions executed on a CPU and without using any type of interrupt mechanism.

In the preferred implementation, the cache/MMU in CPU 201 implements a valid bit and a dirty bit for each cache line and the cache/MMU is able to perform a lookup on a physical address specified by request packet from a module that uses shared memory. FIG. 5 shows a state diagram indicating transitions used to support cache coherency or receipt of a snoop transaction request. It should be noted that the dirty state has a choice of transitions depending on the implementation option taken.

The coherency logic within the requesting module (e.g., PCI bridge 207) preferably can specify one or more caching windows and allow remote specification of the caching policy for a particular region in cache to increase coherency performance. The actual encoding and range sizes as well as the number of discrete ranges that are enabled are a matter of design choice selected to meet the needs of a particular application. In this manner, a cache partition can be implemented by storing an address and the size of the partition within the PCI module 207. The cache coherency policy for that partition can be controlled by setting a mode value within the PCI module 207. This feature of the present invention enables the remote specification of the caching policy in a manner that does not require any manipulation of control registers within CPU 201. Whether or not a flush or purge command is issued is determined by the PCI module 207 and the cache/MMU within CPU 201 merely responds to execute and acknowledge issued cache control commands.

To implement the above feature, PCI module 207 will precede step 401 in FIG. 4 with a step of checking whether the shared memory address requested matches an address specified within the PCI module 207. The stored addresses may indicate that a snoop is to be performed, in which case the process proceeds to step 401. Alternatively, when a snoop is not to be performed the process will proceed to steps 405 and 407 accordingly.

While the invention has been particularly shown and described with reference to a preferred embodiment thereof, it will be understood by those skilled in the art that various other changes in the form and details may be made without departing from the spirit and scope of the invention. The various embodiments have been described using hardware examples, but the present invention can be readily implemented in software. For example, it is contemplated that a programmable logic device, hardware emulator, software simulator, or the like of sufficient complexity could implement the present invention as a computer program product including a computer usable medium having computer readable code embodied therein to perform precise architectural update in an emulated or simulated out-of-order machine. Accordingly, these and other variations are equivalent to the specific implementations and embodiments described herein.

We claim:

1. A computer system comprising:
   a memory system wherein at least a portion of the memory is designated as shared memory;
   a transaction-based bus coupled to the memory system wherein the transaction-based bus includes a cache coherency transaction integrated within its transaction set;
   a processor having a cache memory, the processor coupled to the memory system through the transaction based bus;
   a plurality of system components other than the processor coupled to the transaction-based bus, wherein the system components access the memory system directly through the transaction based bus, but do not access the cache memory directly through the transaction based bus;
   a request issued by one of the plurality of system components and addressed to the processor, wherein the request indicates a request to perform a cache coherency operation; and
   wherein the processor is configured to respond to the request by treating the request as an explicit command to perform the cache coherency operation and wherein the processor response to the request comprises directly executing the cache coherency operation.

2. A computer system comprising:
   a memory system wherein at least a portion of the memory is designated as shared memory;
   a transaction-based bus coupled to the memory system wherein the transaction-based bus includes a cache coherency transaction defined within its transaction set;
   a processor having a cache memory, the processor coupled to the memory system through the transaction based bus;
   a plurality of system components other than the processor coupled to the transaction-based bus, wherein the system components access the memory system directly through the transaction based bus, but do not access the cache memory directly through the transaction based bus;
   a request issued by one of the plurality of system components and addressed to the processor, wherein the request indicates a request to perform a cache coherency operation; and
   wherein the processor is configured to respond to the request by treating the request as an explicit command to perform the cache coherency operation and wherein the processor is further configured to respond to the request by generating a response message addressed to the system component that initiated the request indicating a cache state.

3. A method for managing cache coherency in a shared memory system wherein the shared memory system is shared by a plurality of modules, including a processing unit, and wherein the plurality of modules, including the processing unit, are coupled to a system bus, the method comprising the steps of:
- causing the processing unit to cache at least some locations of the shared memory system in a cache memory;
- initiating a cache coherency transaction on the system bus using one of the plurality of modules rather than the processing unit; and
- in response to the cache coherency transaction, causing the processing unit to directly execute a cache coherency operation indicating a cache memory state independent of assistance of instructions executed on the processing unit.

4. A method for managing cache coherency in a shared memory system wherein the shared memory system is shared by a plurality of modules, including a processing unit, and wherein the plurality of modules, including the processing unit, are coupled to a system bus, the method comprising the steps of:
- causing the processing unit to cache at least some locations of the shared memory system in a cache memory;
- initiating a cache coherency transaction directly on the system bus using one of the plurality of modules rather than the processing unit; and
- in response to the cache coherency transaction, causing the processing unit to execute a cache coherency operation; and
- generating a response to the initiated cache coherency transaction using the processing unit, wherein the response is addressed to the module initiating the cache coherency transaction indicating a cache memory state.

5. At least one computer-readable medium containing a computer program product for managing cache coherency in a shared memory system wherein the shared memory system is shared by a plurality of modules, including a processing unit, and wherein the plurality of modules, including the processing unit, are coupled to a system bus, the computer program product comprising:
- program code for causing the processing unit to cache at least some locations of the shared memory system in a cache memory;
- program code for initiating a cache coherency transaction directly on the system bus using one of the plurality of modules rather than the processing unit;
- in response to the cache coherency transaction, program code for causing the processing unit to execute a cache coherency operation; and
- program code for generating a response to the initiated cache coherency transaction using the processing unit, wherein the response is addressed to the module initiating the cache coherency transaction indicating a cache memory state.

6. At least one computer-readable medium containing a computer program product for managing cache coherency in a shared memory system wherein the shared memory system is shared by a plurality of modules, including a processing unit, and wherein the plurality of modules, including the processing unit, are coupled to a system bus, the computer program product comprising:
- program code for causing the processing unit to cache at least some locations of the shared memory system in a cache memory;
- program code for initiating a cache coherency transaction on the system bus using one of the plurality of modules rather than the processing unit; and
- in response to the cache coherency transaction, program code for causing the processing unit to directly execute a cache coherency operation indicating a cache memory state independent of assistance of instructions executed the processing unit.

* * * * *